(12) United States Patent
Steege et al.

(10) Patent No.: US 8,430,370 B2
(45) Date of Patent: Apr. 30, 2013

(54) ADJUSTABLE DISPLAY MOUNTING

(75) Inventors: Scott Charles Steege, Denver, IA (US); Shawn Michael Bartz, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/357,019

(22) Filed: Jan. 21, 2009

(65) Prior Publication Data
US 2010/0181452 A1    Jul. 22, 2010

(51) Int. Cl.
*E04G 3/00* (2006.01)

(52) U.S. Cl.
USPC ............... 248/292.14; 248/917; 248/919

(58) Field of Classification Search ........... 248/222.51, 248/222.52, 222.41, 224.8, 121, 292.14, 248/288.1, 289.1, 181, 476, 523, 481–484
See application file for complete search history.

(56) References Cited

U.S. PATENT DOCUMENTS

| | | | | |
|---|---|---|---|---|
| 3,730,474 A * | 5/1973 | Bowers | | 248/478 |
| 4,186,905 A * | 2/1980 | Brudy | | 248/478 |
| 4,516,751 A | 5/1985 | Westbrook | | |
| 5,629,810 A * | 5/1997 | Perry et al. | | 359/872 |
| 6,010,111 A * | 1/2000 | Cho | | 248/346.06 |
| 6,039,141 A | 3/2000 | Denny | | |
| 6,092,778 A * | 7/2000 | Lang et al. | | 248/478 |
| 6,116,560 A * | 9/2000 | Kim | | 248/371 |
| 6,286,968 B1 * | 9/2001 | Sailer et al. | | 359/872 |
| 6,302,549 B1 * | 10/2001 | Branham et al. | | 359/871 |
| 6,550,097 B1 * | 4/2003 | Zimmer | | 15/250.34 |
| 6,715,377 B1 * | 4/2004 | Brouwer | | 74/431 |
| 7,399,033 B2 | 7/2008 | Hsiao | | |
| 7,490,946 B1 * | 2/2009 | Foote et al. | | 359/841 |
| 7,645,044 B2 * | 1/2010 | Lee | | 359/876 |
| 7,862,189 B1 * | 1/2011 | Freese | | 359/872 |
| 2004/0011015 A1 | 1/2004 | Nanlawala et al. | | |
| 2004/0227049 A1 * | 11/2004 | Lang et al. | | 248/476 |
| 2005/0218273 A1 | 10/2005 | Huang | | |
| 2006/0289715 A1 | 12/2006 | Tsuboi | | |
| 2008/0073477 A1 * | 3/2008 | Lang et al. | | 248/476 |
| 2008/0100939 A1 * | 5/2008 | Brester | | 359/872 |
| 2008/0247070 A1 * | 10/2008 | Sakata | | 359/877 |
| 2008/0265122 A1 * | 10/2008 | Branham | | 248/479 |
| 2009/0086351 A1 * | 4/2009 | Sakata | | 359/872 |

OTHER PUBLICATIONS

European Search Report received May 26, 2010 (5 pages).

* cited by examiner

*Primary Examiner* — Jonathan Liu
*Assistant Examiner* — Erin W Smith

(57) ABSTRACT

A display panel mounting assembly includes a dome-shaped lower bearing member on a support member, an upper bearing member, and a carrier member attached to the display panel and held between the upper and lower bearing members. The lower bearing member has a central bore and a pair of stops projecting from opposite sides of the bore. The carrier member has a opening which receives the stops. A stop post projects from the support member adjacent the bearing member. An aperture which receives the post is formed in the carrier spaced apart from the opening. The opening and the tabs cooperating to control pivoting of the carrier member with respect to the support member in one degree of freedom. The aperture and the post cooperate to control pivoting of the carrier member in a second degree of freedom.

9 Claims, 6 Drawing Sheets

ADJUSTABLE DISPLAY MOUNTING

FIELD OF THE INVENTION

The present invention relates to an adjustable display bracket.

BACKGROUND OF THE INVENTION

Certain vehicles, such as tractors, are provided with armrest control modules. Display panels are mounted on arms which are attached to and project out from the armrest module. Such display panels must be adjustable in order to accommodate different operators. In a current production design, the display panel is adjustable, but is only pivotable about a single axis. It is desired to have a display panel mounting which can be adjusted more than being pivotal about a single axis.

SUMMARY OF THE INVENTION

Accordingly, an object of this invention is to provide a display panel mounting which can be adjusted more than being pivotal about a single axis.

This and other objects are achieved by the present invention, wherein a mounting assembly is provided for mounting a display panel on a support member. The mounting assembly includes a dome-shaped lower bearing member on the support member, an upper bearing member, and a carrier member attached to the display panel and held between the upper and lower bearing members. The lower bearing member has a central bore and a pair of stops projecting from opposite sides of the bore. The carrier member has a opening which receives the stops. A stop post projects from the support member adjacent the bearing member. An aperture which receives the post is formed in the carrier spaced apart from the opening. The opening and the tabs cooperating to control pivoting of the carrier member with respect to the support member in one degree of freedom. The aperture and the post cooperate to control pivoting of the carrier member in a second degree of freedom. A bolt extends through the lower bearing member, the upper bearing member, and the carrier member. A locknut which is screwed onto an end of the bolt, and the locknut engages a bottom side of the lower bearing member.

Most display brackets include at least one thumb knob for each direction of movement. However, this mounting assembly permits a significant amount of movement without any hardware to loosen. The operator can simply grab the display and reposition it to a desired position. The amount of adjustment in two directions is significant compared to other support systems. The harness is concealed behind a cover to keep a clean, slim looking design. The support system can accommodate multiple displays.

DESCRIPTION OF THE PREFERRED EMBODIMENT

Figure 1:
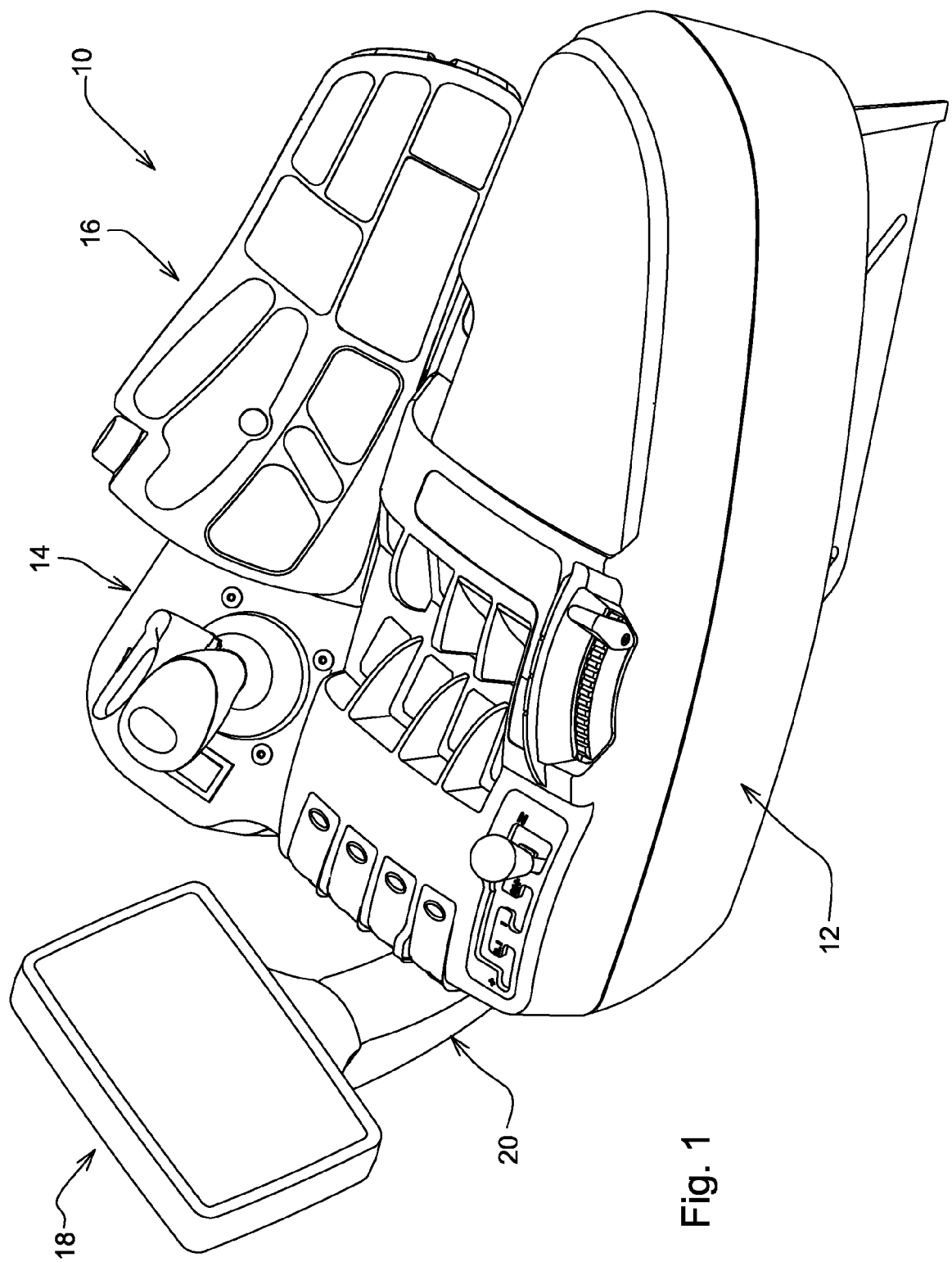
FIG. 1 is an upper perspective view of an armrest assembly including a display panel mounting embodying the invention.

Referring to FIG. 1, an armrest assembly 10 includes an armrest base unit or tub 12, a joystick module 14, a control module 16 and a display panel 18 mounted on an arm 20.

Figure 2:
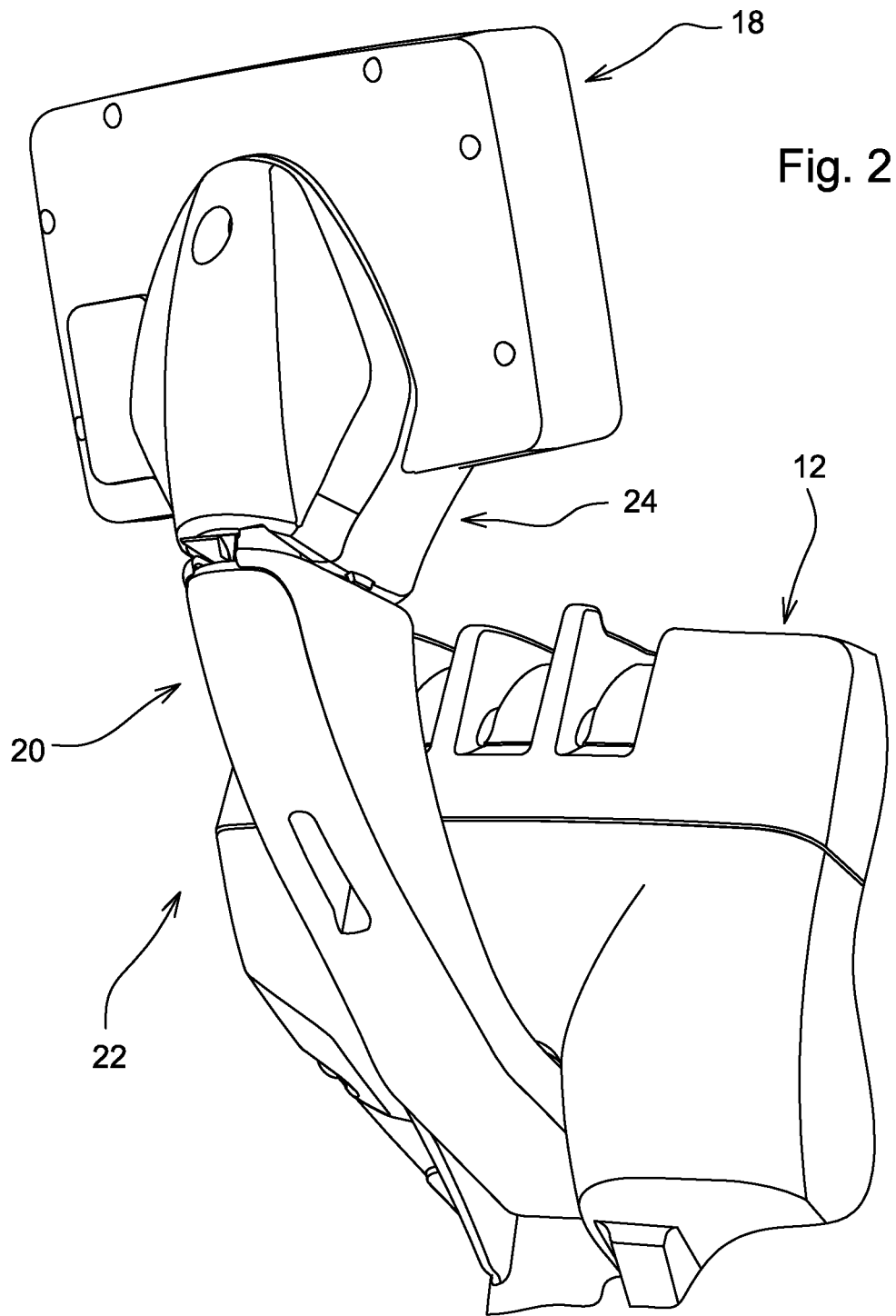
FIG. 2 is a lower front perspective view of the armrest assembly of FIG. 1.

As best seen in FIG. 2, the display panel 18 mounting assembly 22 includes a carrier 24 which is mounted to one end on arm 20. The other end of arm 20 is attached to the underside of base unit 12. The arm 20 is preferably an aluminum die cast component. The carrier 24 is preferably made of nylon 6/6 with 33% glass. A wire harness (not shown) is concealed within the arm 20 and the carrier 24.

Figure 3:
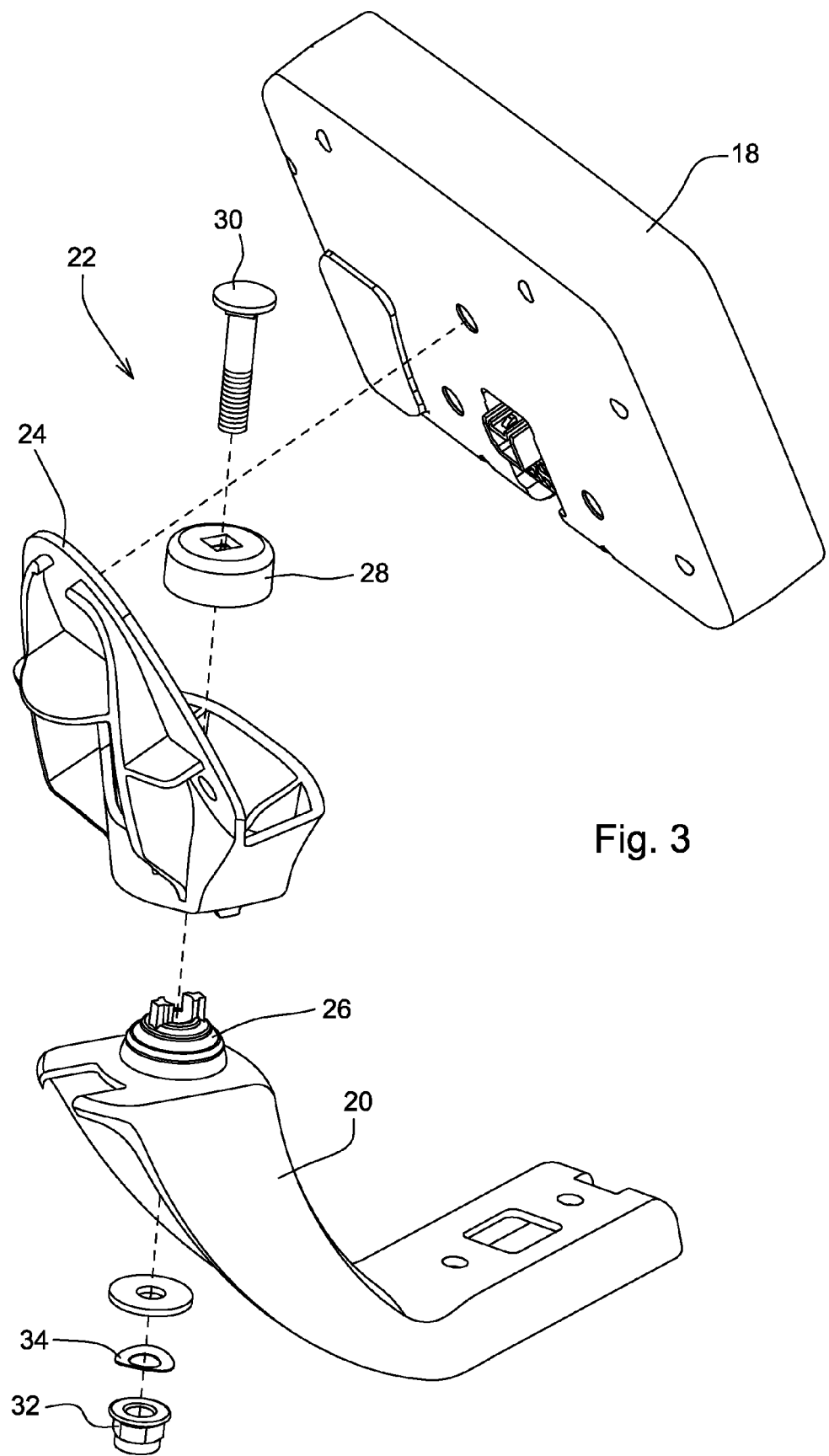
FIGS. 3 and 4 are exploded perspective views of the display panel mounting assembly of FIG. 2.
Figure 4:
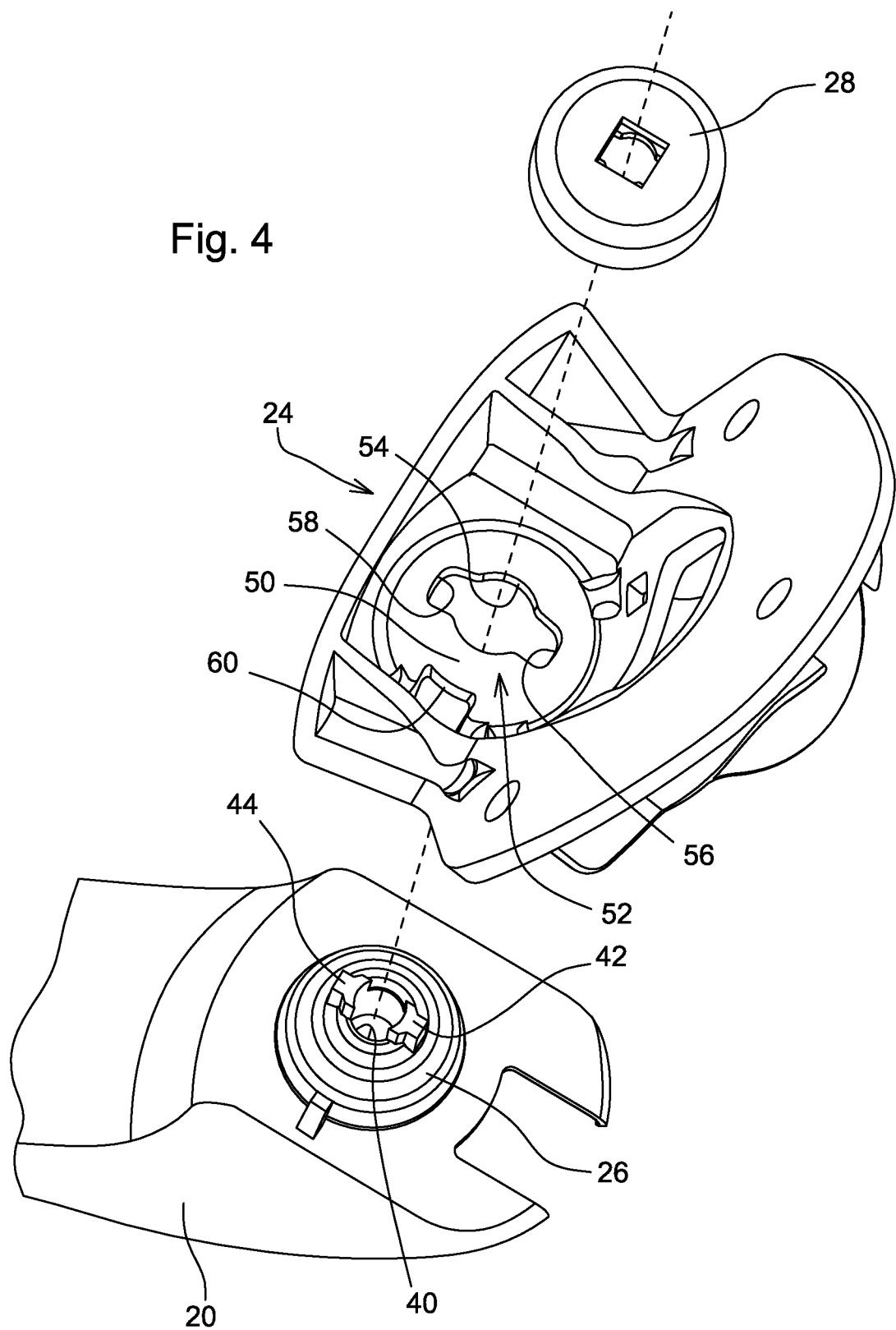

Referring now to FIG. 3, the mounting assembly 22 includes carrier 24 which is attached to the panel 18, a spherical or dome-shaped lower bearing 26 on an upper end of arm 20, a dome-shaped upper bearing 28, a bolt 30, a lock nut 32 and a bevel washer 34. The upper bearing is preferably made of nylon. Bolt 30 is preferably a carriage bolt. The lock nut 32 is screwed onto an end of the bolt 30 and engages a bottom side of the lower bearing 26. As best seen in FIG. 4, the lower bearing 26 is fixed with or integral to the support arm 20. The outer edge of the lower bearing 26 is surrounded by the support arm 20 and the lower bearing projects away from the surrounding surface of the support arm 20. Only the carrier 24 and the panel 18 are movable with respect to the support arm 20.

Figure 5:
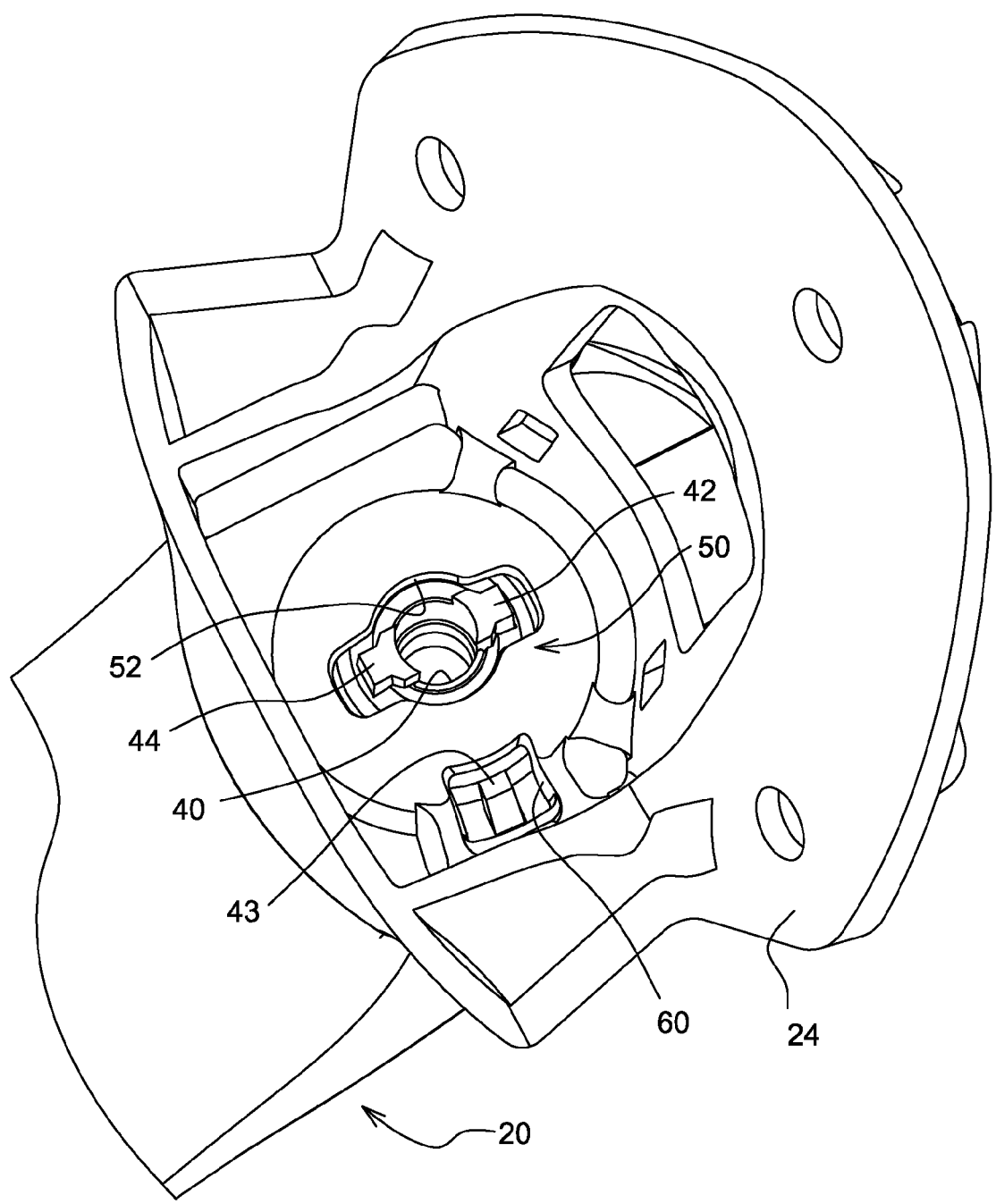
FIG. 5 is a perspective view of the display panel mounting assembly of FIG. 2, with parts removed for clarity.

Referring now to FIGS. 4 and 5, the lower bearing 26 has a central bore 40 and a pair of upwardly projecting stops or posts 42 and 44 on opposite sides of the bore 42. Each of the stops 42 and 44 extends only part way from the edge of the opening 40 towards the outer edge of the lower bearing 26. A stop post 43 projects from the arm 20 adjacent to one side of the lower bearing 26. The lower end of carrier 24 forms a dome-shaped partially spherical bearing surface 50 in which is formed an opening 52. Opening 52 has circular central portion 54 and a pair of rectangular slots 56 and 58 extending in opposite directions from each other. Bearing surface 50 receives and mates with lower bearing 26, and the opening 52 receives the tabs 42 and 44. The lower end of carrier 24 also forms a stop. aperture 60 which receives the post 43. Aperture 60 is preferably rectangular or square, and the sides of aperture 60 are engagable with the post 43 to limit pivoting of the carrier 24 with respect to the arm 20.

Figure 6:
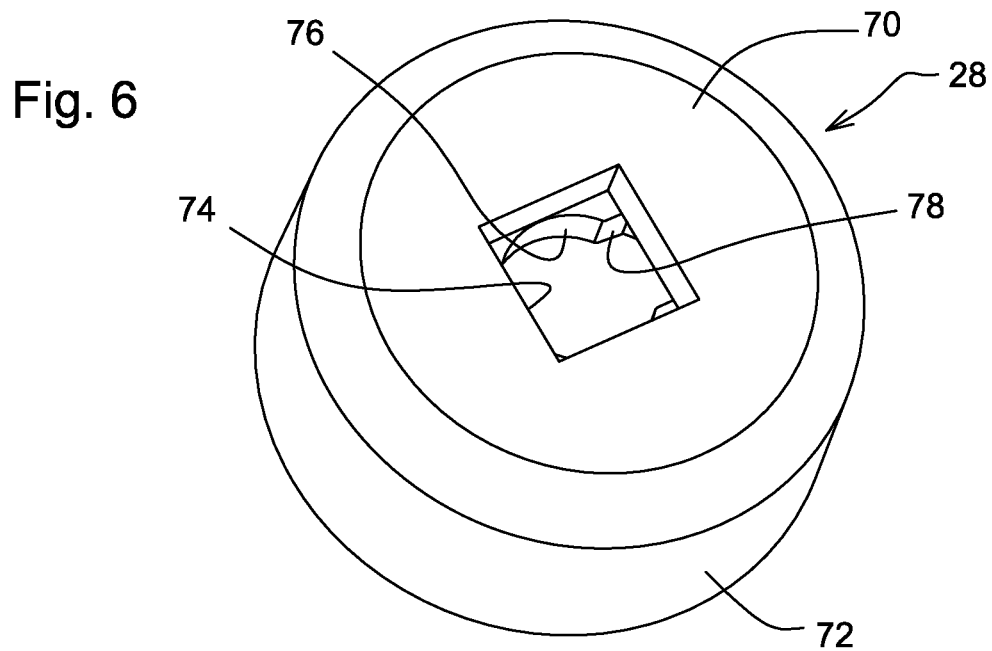
FIGS. 6 and 7 are perspective views of the upper bearing of FIG. 3.
Figure 7:
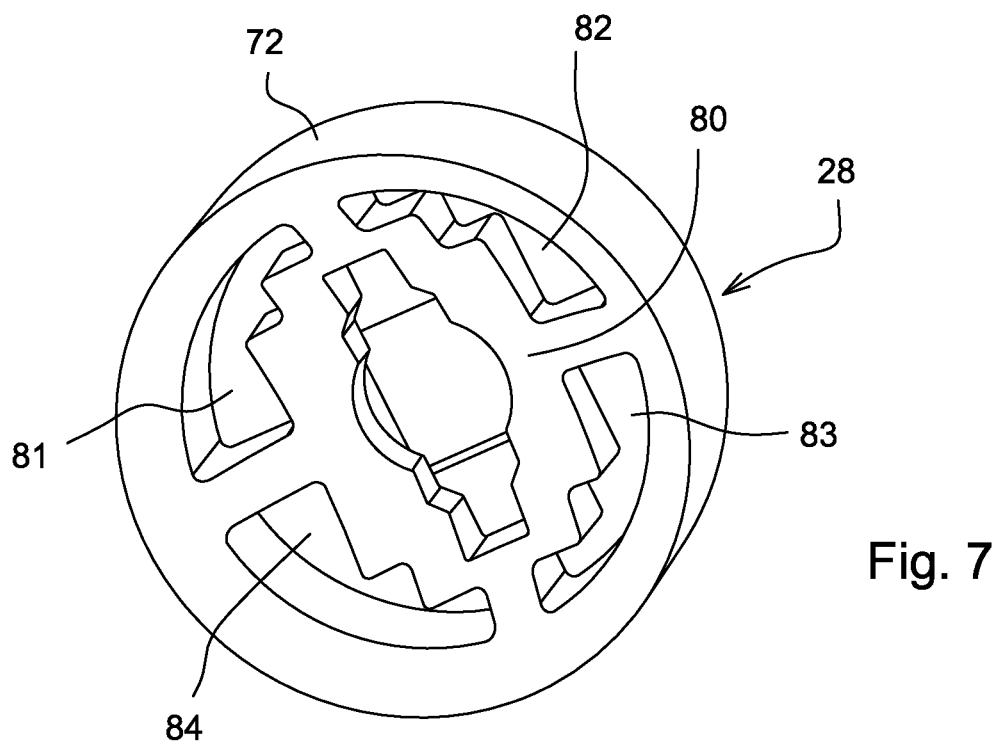

As best seen in FIGS. 6 and 7, the upper bearing 28 has a flat circular top 70 surrounded by a cylindrical skirt 72. A square recess 74 is formed in the center of the top 70. Recess 74 receives the head portion of the carriage bolt 30 which thereby prevents rotation of the upper bearing 28. A circular opening 76 extends through the recess 74 and a slot 78 projects from one side of the opening 76. A series of ridges 81, 82, 83 and 84 are formed on the underside of the top 70. The ridges 81-84 are engagable with the outer surface of the bearing surface 50.

When assembled as shown in FIGS. 1 and 2, the bearing 50 is frictionally held between the upper bearing 28 and the lower bearing 26. As best seen in FIG. 5, the carrier 24 can pivot or swivel around the axis of bore 40, because the dimensions of the slots 56 and 58 are larger than the corresponding dimensions of the stops 42 and 44. The pivoting of carrier 24 about the axis of bore 40 is limited by the engagement of post 43 with one pair of sides of opening 60. In addition to being pivotal about the axis of bore 40, the carrier 24 is also pivotal in directions parallel to the long dimension of opening 52, or about a axis which is perpendicular to the axis of bore 40. Pivoting in these directions is limited by the engagement of tab 43 with another pair of sides of opening 60. As a result, the carrier 24 and the display panel 18 can pivot with two degrees of freedom with respect to the support arm 20.

The carrier 24 is allowed to pivot and swivel on the spherical surface of bearing 26 between the main arm 20 and the nylon bearing 28. There is 16 degrees of movement allowed in a horizontal swivel plane and 7 degrees of movement in a vertical plane around the bearing 26 without any hardware adjustments. The bevel washer 34 provides enough spring load in the joint to maintain position after adjustment. The operator can simply grab the display panel 18 and rotate and/or pivot it to a desired position. The components are designed to conceal the wiring harness needed for the display. The support assembly could support multiple displays. The force required to move the display carrier 24 can be changed by applying more torque to the lock nut 34 on the carriage bolt 30. This would be advantageous for larger, heavier displays mounted on the same arm.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A mounting assembly for mounting a display panel on a support member, the mounting assembly comprising:
a single dome-shaped lower bearing member immovably fixed to and projecting from the support member, the lower bearing member forming a convex bearing surface, the lower bearing member having a central axis, the lower bearing member having a pair of stops projecting outwardly therefrom, the stops extending parallel to the central axis, each of the stops extending only part way from an edge of the central bore to an outer edge of the lower bearing member;
an upper bearing member;
a carrier part which is attached to the display panel, the carrier part having a dome shaped carrier bearing member formed thereon, the carrier bearing member directly slidably engaging the convex bearing surface of the lower bearing member, the carrier bearing member directly engaging the upper bearing member and being held between the upper and lower bearing members, the carrier member having an upper surface and a lower surface, the carrier member having a opening which receives the stops, the opening extending through the carrier member from the upper surface to the lower surface, the opening and the stops cooperating to permit the carrier member to pivot with respect to the support member with at least two degrees of freedom; and
a fastener member having an end which engages the upper bearing member and a shaft which extends through the upper bearing member, the carrier bearing member and the lower bearing member, the fastener member holding the upper bearing member, the carrier bearing member and the lower bearing member together, and wherein only the carrier member and the display panel are movable with respect to the support member.

2. The mounting assembly of claim 1, wherein:
a stop post projects from the support member adjacent the bearing member; and
an aperture is formed in the carrier spaced apart from the opening, the post being engagable with sides of the aperture to limit pivoting of the carrier member with respect to the support member.

3. The mounting assembly of claim 2, wherein:
the aperture has a rectangular shape.

4. The mounting assembly of claim 1, wherein:
the opening has a circular central portion and a pair of rectangular slots extending in opposite directions from each other.

5. The mounting assembly of claim 1, further comprising:
a bolt which extends through the lower bearing member, the upper bearing member, and the carrier member.

6. The mounting assembly of claim 5, further comprising:
a locknut which is screwed onto an end of the bolt, and the locknut engages a bottom side of the lower bearing member.

7. The mounting assembly of claim 1, wherein:
the lower bearing member has a central bore extending therethrough; and
a coupling member extends through the central bore and couples the upper bearing member and the carrier member to the lower bearing member.

8. The mounting assembly of claim 7, wherein:
the stops project from opposite sides of the central bore.

9. A mounting assembly for mounting a display panel on a support member, the mounting assembly comprising:
a single dome-shaped lower bearing member immovably fixed to and projecting from the support member, the lower bearing member forming a convex bearing surface, the lower bearing member having a central axis;
an upper bearing member;
a carrier part which is attached to the display panel, the carrier part having a dome shaped carrier bearing member formed thereon, the carrier bearing member directly slidably engaging the convex bearing surface of the lower bearing member, the carrier bearing member directly engaging the upper bearing member and being held between the upper and lower bearing members, the carrier member having an upper surface and a lower surface, the lower surface directly engaging the lower bearing member, the upper surface directly engaging the upper bearing member, the bearing members cooperating to permit the carrier part to pivot with respect to the support member with at least two degrees of freedom; and
a fastener member having an end which engages the upper bearing member and a shaft which extends through the upper bearing member, the carrier bearing member and the lower bearing member, the fastener member holding the upper bearing member, the carrier bearing member and the lower bearing member together, and wherein only the carrier member and the display panel are movable with respect to the support member.

* * * * *